United States Patent
Ko et al.

(10) Patent No.: US 8,028,552 B2
(45) Date of Patent: Oct. 4, 2011

(54) STRUCTURE OF AUTOMOBILE ELECTRONIC KEY FOR SECURITY AND METHOD FOR PERFORMING FUNCTION THEREOF

(75) Inventors: Jae Pyung Ko, Gyeongsangnam-Do (KR); Young Tak Kim, Busan (KR); Kyoung Moon Lee, Busan (KR); Min Seok Kim, Busan (KR); Jae Woo Yang, Daejun (KR)

(73) Assignee: Dong-A University Research Foundation for Industry Academy Cooperation, Busan (KR)

( * ) Notice: Subject to any disclaimer, the term of this patent is extended or adjusted under 35 U.S.C. 154(b) by 159 days.

(21) Appl. No.: 12/178,468

(22) Filed: Jul. 23, 2008

(65) Prior Publication Data
US 2009/0031767 A1    Feb. 5, 2009

(30) Foreign Application Priority Data
Jul. 31, 2007    (KR) ........................ 10-2007-0077105

(51) Int. Cl.
*B60R 25/02* (2006.01)
(52) U.S. Cl. ........................................................ 70/252
(58) Field of Classification Search .................... 70/252, 70/182–186
See application file for complete search history.

(56) References Cited

U.S. PATENT DOCUMENTS

| | | | |
|---|---|---|---|
| 6,257,031 B1* | 7/2001 | Misner | 70/252 |
| 6,354,117 B1* | 3/2002 | Canard | 70/186 |
| 6,382,003 B1* | 5/2002 | Watanuki et al. | 70/252 |
| 6,389,856 B1* | 5/2002 | Watanuki et al. | 70/186 |
| 6,786,069 B2* | 9/2004 | Ochi | 70/252 |
| 7,028,515 B2* | 4/2006 | Chung | 70/186 |
| 7,302,817 B2* | 12/2007 | Ohtaki et al. | 70/186 |
| 7,591,158 B2* | 9/2009 | Konno et al. | 70/252 |
| 2003/0079509 A1* | 5/2003 | Ochi | 70/186 |
| 2003/0231100 A1* | 12/2003 | Chung | 340/5.2 |
| 2004/0227615 A1* | 11/2004 | John et al. | 340/5.61 |
| 2005/0012593 A1* | 1/2005 | Harrod et al. | 340/5.72 |
| 2006/0081023 A1* | 4/2006 | Tanimoto | 70/186 |
| 2006/0220458 A1* | 10/2006 | Feldman et al. | 307/10.3 |
| 2006/0225985 A1* | 10/2006 | Dimig et al. | 192/84.1 |

(Continued)

FOREIGN PATENT DOCUMENTS

JP    2001323698    11/2001

(Continued)

*Primary Examiner* — Kristina Fulton
(74) *Attorney, Agent, or Firm* — Lowe Hauptman Ham & Berner LLP (57) ABSTRACT

Provided are a structure of an automobile electronic key for security and a method for performing the function thereof. It is determined whether at least one of a driver seat door closing signal and a brake pedal signal is on. A key fob of an automobile is requested to send the ID thereof, and the ID is received from the key fob when at least one of the driver seat door closing signal and the brake pedal signal is on. The key fob is authenticated using the received ID. An actuator is driven to move a locking member such that a car key is switched to a rotatable state when the key fob passes authentication. The actuator is driven to move the locking member such that the car key is switched to an unrotatable state when the key fob does not pass authentication.

7 Claims, 8 Drawing Sheets

U.S. PATENT DOCUMENTS

| | | | |
|---|---|---|---|
| 2007/0131004 A1* | 6/2007 | Chung | 70/252 |
| 2007/0284943 A1* | 12/2007 | Meeks | 307/10.3 |
| 2008/0178643 A1* | 7/2008 | Okuno et al. | 70/184 |
| 2008/0236216 A1* | 10/2008 | Takeuchi et al. | 70/207 |
| 2009/0031767 A1* | 2/2009 | Ko et al. | 70/336 |
| 2009/0033150 A1* | 2/2009 | Ko et al. | 307/10.6 |

FOREIGN PATENT DOCUMENTS

| | | |
|---|---|---|
| JP | 2002242501 | 8/2002 |
| KR | 1020060019343 | 3/2006 |

\* cited by examiner

STRUCTURE OF AUTOMOBILE ELECTRONIC KEY FOR SECURITY AND METHOD FOR PERFORMING FUNCTION THEREOF

BACKGROUND OF THE INVENTION

1. Field of the Invention

The present invention relates to a structure of an automobile electronic key for security and a method for performing the function thereof, and more particularly, to a structure of an automobile electronic key for security and a method for performing the function thereof, which allow a proper user to insert the key of an automobile and rotate the inserted key to operate steering and start the engine of an automobile.

2. Description of the Related Art

Generally, an ignition lock device of an automobile is also called a start switch for starting the engine of the automobile and integrated with a locking device of a steering column in order to prevent the automobile from being stolen.

The ignition lock device of an automobile is fixed to a steering column connected to a steering wheel and includes a key hole into which a car key is inserted by a driver. That is, the ignition lock device includes an ignition lock into which a car key is inserted, a key cylinder rotated with the car key being inserted into the ignition lock such that the car key operates, and an ignition lock body for performing a locking operation according to the operating state of the key cylinder, and the state of the automobile is changed according to the rotating operation of the car key. The rotating operation of the car key is composed of four steps of a locking step, an accessory power supply step, a controller and driver on step, and a starting step. The car key is inserted into or ejected from the ignition lock only in the locking step.

The aforementioned conventional ignition lock device is a mechanical lock device provided near a car door locking unit and the steering column. This mechanical lock device operates according to the rotating operation of the car key inserted by a driver to start the engine or cancel a locked state of the steering column.

However, the conventional mechanical lock device requires the driver to insert the car key thereinto and rotate the car key. Furthermore, even though the conventional mechanical lock device is damaged, the engine can be started through a simple operation. Accordingly, the automobile having the mechanical lock device is easily stolen.

To solve this problem, a smart key is provided to some of recent automobiles on the market. The car using the smart key has a key cylinder and a steering column in modified structures such that the car key cannot be inserted into the key cylinder when normal authentication is not performed. A user can lock/unlock the doors of the car only using the smart key and start the car according to an authentication result without inserting the car key into the key cylinder.

However, in the case of a car having no smart key, it is required to insert a mechanical key into the key cylinder and rotate the key to unlock the steering column in order to start the car. Accordingly, to apply the smart key to the car using the mechanical key to eliminate the inconvenience of inserting and rotating the key, the car key must be being inserted into the key cylinder all the time. In this case, the car can be stolen because the car key is being inserted into the key cylinder.

SUMMARY OF THE INVENTION

It is an object of the present invention to provide a structure of an automobile electronic key for security and a method for performing the function thereof, which prevent users other than a proper user from inserting and rotating a car key into an automobile such that a steering operation and an engine starting operation cannot be performed and allow only the proper user to start the engine of the automobile.

A structure of an automobile electronic key for security according to the present invention comprises an ignition knob body, an ignition knob rotator, a rotation axis, a locking member, and a controller. The ignition knob body is provided at the front of a key cylinder into which a car key is inserted. The ignition knob rotator is provided at the front of the ignition knob body and includes an actuator operating according to a driving signal. The rotation axis is located inside the ignition knob body in parallel with the axial direction of the key cylinder and moved such that the car key is switched to an insertion available state or an insertion unavailable state according to the position of the rotation axis. The locking member is located inside the ignition knob rotator on one side of the central axis of the key cylinder and moved in parallel with the axial direction of the key cylinder such that the car key is switched to a rotatable state or unrotatable state according to the position of the locking member. The controller performs authentication on a key fob and drives the actuator according to whether the key fob passes authentication to move the locking member such that the car key is switched to the rotatable state or the unrotatable state.

A method for performing the function of an automobile electronic key structure for security according to the present invention comprises the steps of determining whether at least one of a driver seat door closing signal and a brake pedal signal is on, requesting a key fob of an automobile to send the ID thereof and receiving the ID from the key fob when at least one of the driver seat door closing signal and the brake pedal signal is on, authenticating the key fob using the received ID, and driving an actuator to move a locking member such that a car key is switched to a rotatable state when the key fob passes authentication and driving the actuator to move the locking member such that the car key is switched to an unrotatable state when the key fob does not pass authentication.

As described above, according to the present invention, it is possible to realize the ignition knob that can be locked and released at a low cost without changing the structures of the existing steering column and key cylinder.

Furthermore, only a proper user can rotate the car key using the automobile electronic key structure for security according to the present invention to improve the security of the automobile.

Moreover, according to the present invention, the proper user can start the engine of the automobile with a simple operation.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE PREFERRED EMBODIMENTS

The present invention will now be described more fully with reference to the accompanying drawings, in which exemplary embodiments of the invention are shown. The invention may, however, be embodied in many different forms and should not be construed as being limited to the embodiments set forth therein; rather, these embodiments are provided so that this disclosure will be thorough and complete, and will fully convey the concept of the invention to those skilled in the art.

Figure 1:
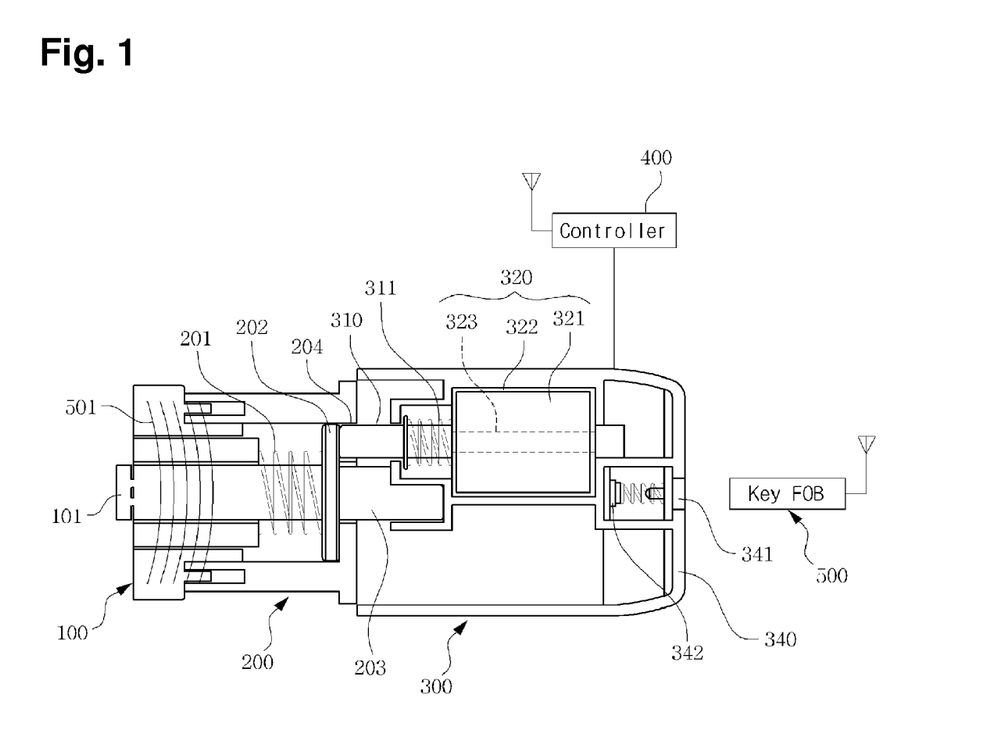
FIG. 1 is a cross-sectional view of a structure of an automobile electronic key for security according to an embodiment of the present invention.

FIG. 1 is a cross-sectional view of a structure of an automobile electronic key for security according to an embodiment of the present invention.

Referring to FIG. 1, the structure of the automobile electronic key for security according to an embodiment of the present invention includes an ignition knob body 200, an ignition knob rotator 300, and a controller 400. The ignition knob body 200 is provided at the front of a key cylinder 100. The ignition knob rotator 300 is provided at the front of the ignition knob body 200. The controller 400 is connected to the ignition knob rotator 300 through a wire and transmits/receives signals to/from the ignition knob rotator 300.

A car key 101 is inserted into the key cylinder 100 and a power mode of the automobile is changed according to the rotating state of the inserted car key 101. That is, the car key 101 is rotated through four steps of a locking step, an accessory power supply step, a controller and driver on step, and a starting step while being inserted into the key cylinder 100, and thus the power mode of the automobile is changed according to the rotating state of the car key 101.

The ignition knob body 200 is provided at the front of the key cylinder 100. Particularly, it is desirable that the ignition knob body 200 is separated from the key cylinder 100. Accordingly, the ignition knob body 200 and the key cylinder 100 are combined with each other when the car key having a mechanical structure is inserted thereinto. In the current embodiment of the present invention, the ignition knob body 200 has a cylindrical shape and is fixed onto a steering column connected to a steering wheel of the automobile.

More specifically, the ignition knob body 200 includes a first spring 201, a connecting part 202, a rotation axis 203 and a locking hole 204. The firs spring 201 automatically ejects the car key 101 being inserted into the key cylinder 100 and the ignition knob body 200 according to elasticity in the locking step. The connecting part 202 is formed in a cylindrical shape in the ignition knob body 200, perpendicularly to the axis of the key cylinder 100, and has a low height. In view of the functional side, the connecting part 202 connects the key cylinder 100 and the ignition knob body 200 between the key cylinder 100 and the ignition knob body 200. The rotation axis 203 is located at the front of the connecting part 202 in the ignition knob body 200. Particularly, the rotation axis 203 has a predetermined length in parallel with the axial direction of the key cylinder 100 and is connected to a central hole of the ignition knob rotator 300. It is desirable that the rotation axis 203 is formed in the shape of a cylinder longer than the connecting part 202 in parallel with the axial direction of the key cylinder 100. It is desirable that the rotation axis 203 is attached to the front of the connecting part 202 and integrated with the connecting part 202. In view of the functional side, the rotation axis 203 is moved to switch the car key 101 to an insertion available state or an insertion unavailable state according to the position of the rotation axis 203. That is, when the rotation axis 203 integrated with the connecting part 202 is moved to push the car key 101 according to elasticity of the first spring 201, the car key 101 is inserted into the key cylinder 100.

The locking hole 204 is formed on a circular plate provided at the front of the connecting part 202 and located on one side of the central axis of the key cylinder 100 such that the locking hole 204 corresponds to a locking member 310. That is, the locking hole 204 is formed at the back of the ignition knob rotator 300. It is desirable that the locking member 310 is formed in a cylindrical shape. The locking hole 204 can be a circular hole having a diameter greater than that of the circular shape of the cross section of the end of the locking member 210 such that the locking hole 204 and the circular shape of the locking member 210 can be combined with each other. In view of the functional side, the locking hole 204 guides the locking member to move and the car key 101 cannot be rotated when the locking member 310 is moved into the locking hole 204.

The ignition knob rotator 300 is provided at the front of the ignition knob body 200, formed in a cylindrical shape and includes a second spring 311 and an actuator 320. The locking member 310 is located on one side of the central axis of the key cylinder 100. When the locking member 310 enters the locking hole 204, the end of the locking member 310 comes into contact with the connecting part 202. In view of the functional side, the car key 101 is switched to a rotatable state when the locking member 310 is ejected from the locking hole 204 and the car key 101 is switched to an unrotatable state when the locking member 310 is inserted into the locking hole 204. That is, the locking member 310 is moved in parallel with the axial direction of the key cylinder 100 such that the car key 101 is switched to the rotatable state or the unrotatable state according to the position of the moved locking member 310.

The second spring 311 automatically moves the locking member 310 that operates by current to the inside of an electromagnet 321 according to elasticity when there is no current supply according to a control signal from the controller 400.

The actuator 320 includes the electromagnet 321 and a polarity converter 322. The electromagnet 321 wound by a coil in a predetermined solenoid form. It is desirable that the polarity converter 322 is connected to both ends of the electromagnet 321 through terminals. While the polarity converter 322 surrounds the electromagnet 321 in FIG. 1, the polarity converter 322 can be located at a distance from the electromagnet 321. In view of the functional side, the polarity converter 322 converts polarities of both ends of the electromagnet 321. It is desirable that the locking member 310 is inserted into and ejected from the locking hole 204 according to polarity change in the electromagnet 321.

The controller 400 receives the ID of a key fob 500 carried by an automobile user (driver) through wireless communication with the key fob 500 and performs authentication on the key fob 500 using the received ID. When the key fob passes authentication, the controller 400 controls the actuator 320 to operate to move the locking member 310 such that the car key 101 is switched to the rotatable state. The key fob 500 includes its ID having information on a proper user of the automobile. Furthermore, the key fob 500 includes a battery (not shown), and thus the key fob 500 can perform wireless communication with the controller 400 when approaching or entering the automobile. That is, controller 400 performs wireless communication with the key fob through an antenna attached to the inside of the automobile. Furthermore, the controller 400 is connected to a driver seat door closing sensing switch and a brake pedal switch (not shown) to sense whether a driver seat door is closed and a brake pedal is stepped on. That is, the controller 400 starts to communicate with the key fob 500 when the driver seat door is closed or the driver steps on a brake pedal. The controller 400 unlocks the locking member 204 after authentication of the key fob 500 through communication with the key fob 500 to prevent the automobile from abnormally suddenly starting.

In addition, the controller 400 requests the key fob 500 to send the ID thereof through wireless communication and receives the ID from the key fob 500 when a driver seat door closing signal or a brake pedal signal provided to the automobile are on.

In the current embodiment of the present invention, the controller 400 includes a timer (43 of FIG. 4) that counts the time elapsed after the key fob 500 is authenticated. The controller 400 can drive the actuator 320 to move the locking member 310 such that the car key 101 is switched to the unrotatable state when the engine of the automobile is not started for a predetermined time after the key fob 500 passes authentication.

The structure of the automobile electronic key according to the present invention further includes a battery and a coil antenna 501 for supplying power to the battery. The controller 400 can apply a driving signal to the coil antenna 501. The coil antenna 501 is used when the automobile electronic key structure according to the present invention and the key fob 500 have insufficient battery capacity. The coil antenna 501 can also be used for an immobilizer function of the automobile.

An ignition knob head 340 is provided at the front of the ignition knob rotator 300. The head 340 includes a key fob docking hole 341 combined with the key fob 500 and the key fob docking hole 341 includes a terminal 342 that detects the combination of the key fob 500 with the key fob docking hole 341. The key fob 500 must be combined with the key fob docking hole 341 in order to use the immobilizer function of the automobile. When the key fob 500 is inserted into the key fob docking hole 341, a combination signal is input to the controller 400 through the terminal 342 to perform the immobilizer function.

FIGS. 2A, 2B, 2C and 2D are views for explaining the operating principle of the structure of the automobile electronic key for security according to the present invention.

Figure 2A:
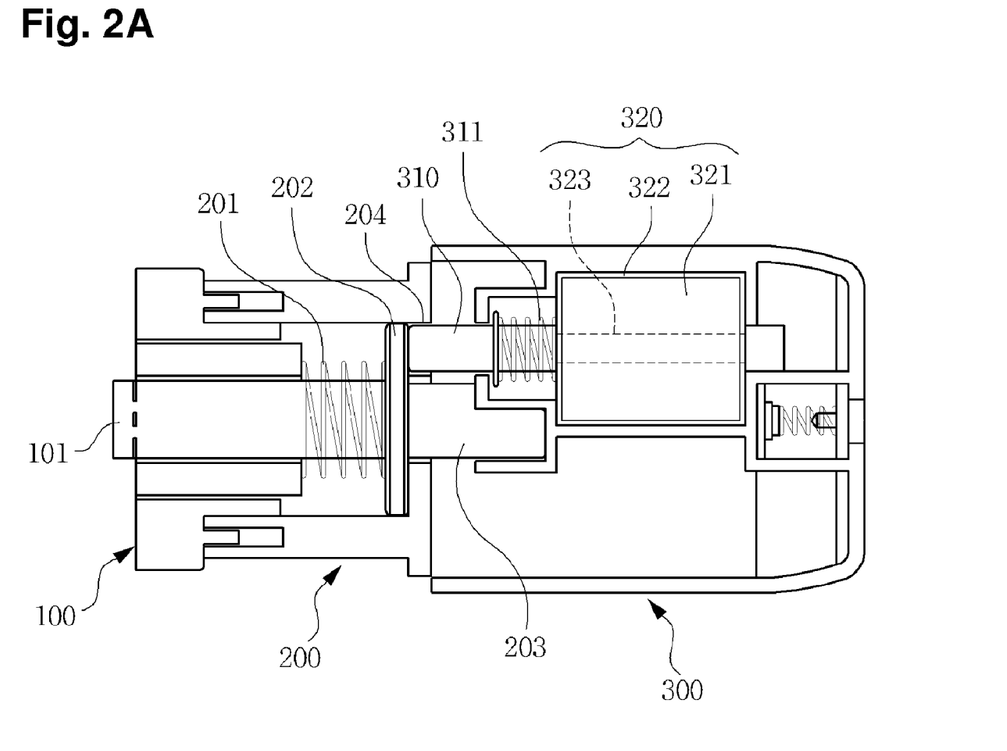
FIGS. 2A, 2B, 2C and 2D are views for explaining the operating principle of the structure of the automobile electronic key for security according to the present invention.
Figure 2B:
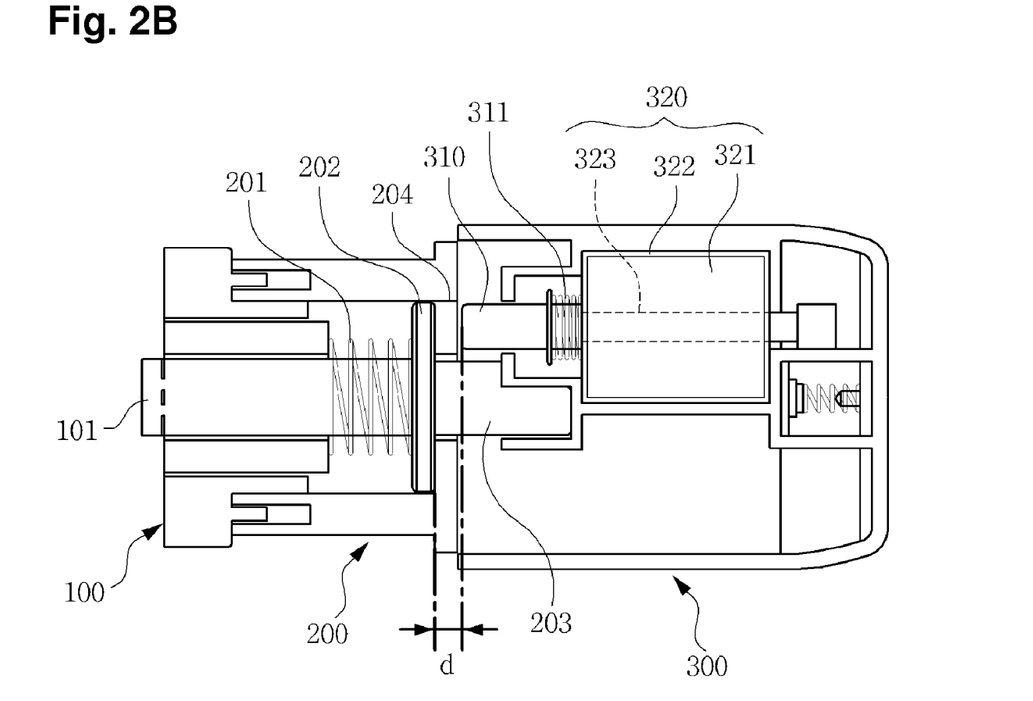

Referring to FIG. 2A, the actuator 320 moves the locking member 310. That is, current is applied to both ends of the electromagnet 321 according to a driving signal of the controller 400 to move the locking member 310 to the inside of the electromagnet 321 (to the right in the drawing) through an internal hole 323 of the electromagnet 321 by a predetermined distance d. The predetermined distance d is 4 mm in an embodiment of the present invention. That is, the locking member 310 located in the locking hole 204 is moved to the outside of the locking hole 204 and separated from the locking hole 204, as shown in FIG. 2B.

Figure 2C:
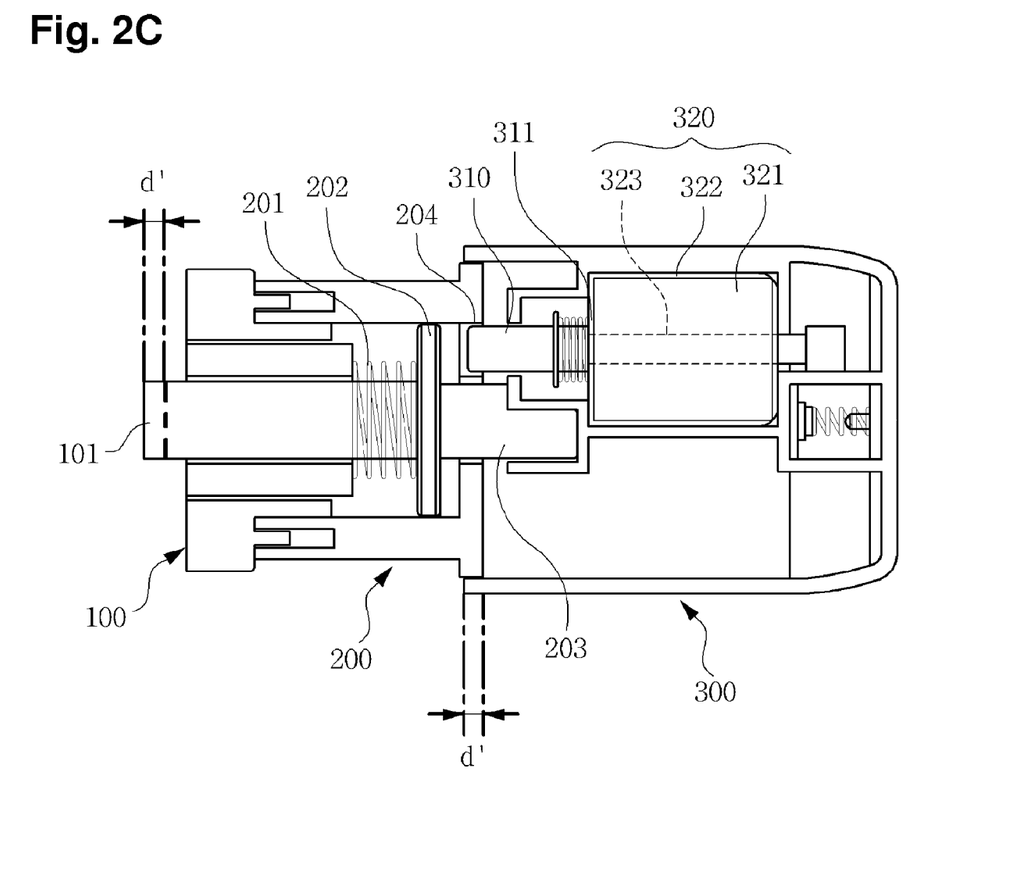

Referring to FIG. 2C, after the locking member 310 is moved, the ignition knob rotator 300 is moved to a direction opposite to the direction in which the locking member 310 has been moved (to the left in the drawing) in order to insert the car key 101 into the key cylinder 100. Then, the rotation axis 203 placed inside the ignition knob rotator 300 is moved together with the ignition knob rotator 300. Furthermore, the connecting part 202 located in the ignition knob body 200 is integrated with the rotation axis 203, and thus the connecting part 203 is also moved together with the ignition knob rotator 300 and the rotation axis 203. Here, if the ignition knob rotator 300 is moved to the direction opposite to the direction in which the locking member 310 has been moved (to the left in the drawing) by more than the predetermined distance d, the locking member 310 is moved into the locking hole 240 again so that the ignition knob rotator 300 cannot be rotated. Accordingly, it is required to move the ignition knob rotator 300 by a predetermined distance d' such that the locking member 310 is not moved into the locking hole 204 again. In an embodiment of the present invention, the predetermined distance d' is 2 mm. When the rotation axis 203 and the connecting part 202 are moved, the car key 101 is inserted into the key cylinder 100 by the predetermined distance d' according to elasticity of the first spring 201 provided at the back of the connecting part 202. Accordingly, the car key 101 is protruded to the outside by the predetermined distance d'.

Figure 2D:
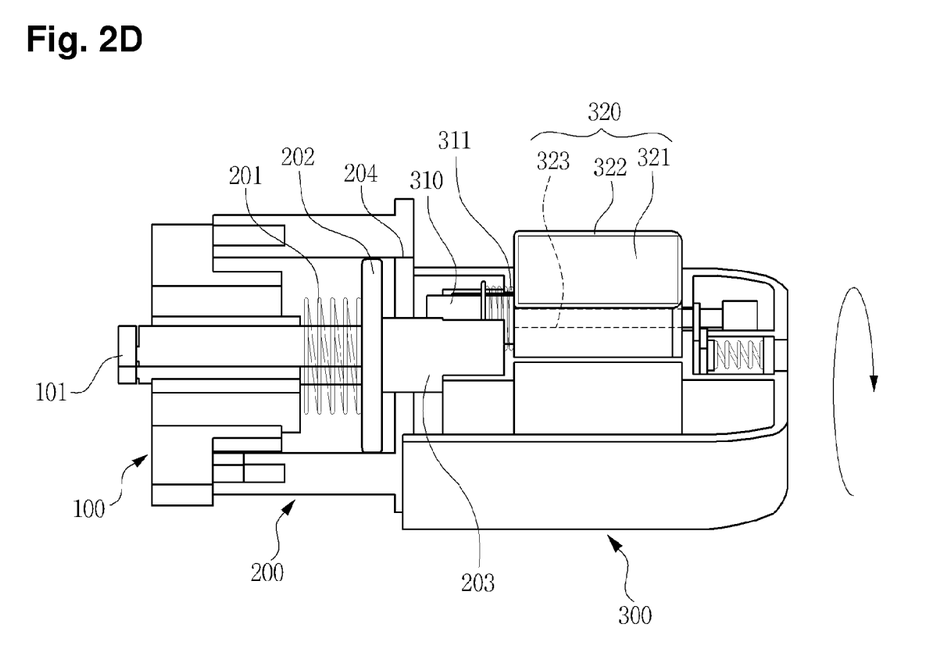

Referring to FIG. 2D, when the locking member 310 is moved to the outside of the locking hole 204 and the car key 101 is inserted through the aforementioned operation, it is possible to rotate the car key 101 because the locking member 310 that prevents the ignition knob rotator 300 from rotating is removed. That is, the car key 101 can be switched between the insertion available state and unavailable state according to the position to which the rotation axis 203 integrated with the connecting part 202 is moved and the car key 101 can be switched between the rotatable state and unrotatable state according to the position to which the locking member 310 is moved.

Figure 3A:
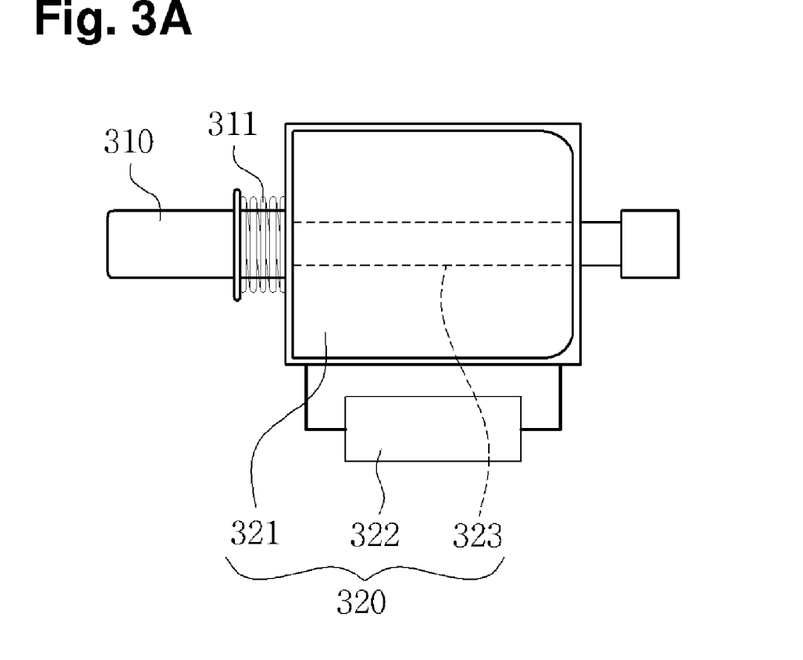
FIGS. 3A and 3B are exemplary views showing operations of a locking member and an actuator in the structure of the automobile electronic key for security according to the present invention.
Figure 3B:
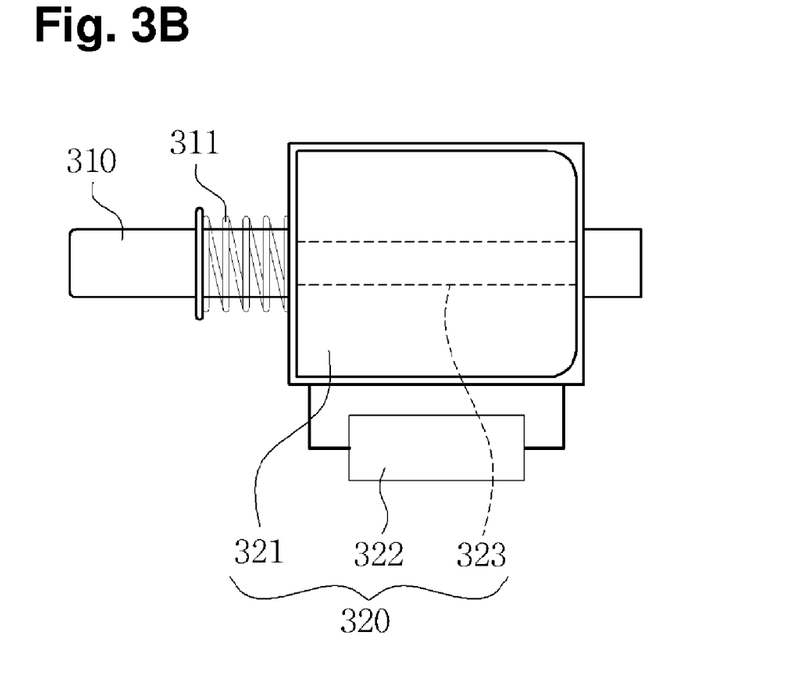

FIGS. 3A and 3B are exemplary views showing operations of the locking member and the actuator in the structure of the automobile electronic key for security according to the present invention.

Referring to FIG. 3A, after the key fob is authenticated, the ignition knob rotator 300 receives a driving signal from the controller 400 and transmits the driving signal to the electromagnet 321 of the actuator 320. That is, when current according to the driving signal is supplied to the electromagnet 321 wound by the coil in a predetermined solenoid form in the ignition knob rotator 300, a magnetic field is generated so the locking member 310 located at the center of the inside of the electromagnet 321 is moved to the right. It is desirable that the locking member 310 is formed of iron (iron core). An ignition knob releasing operation is performed through this process.

Referring to FIG. 3B, since the electromagnet 321 is operated by current when there is no current supply according to a control signal from the controller 400, the locking member 310 is automatically moved to the left according to elasticity of the second spring 311. Furthermore, when the polarity converter 322 converts the polarities of both ends of the electromagnet 321 while current is being supplied, the locking member 310 is moved to the left. An ignition knob locking operation is performed through this process. Although the polarity converter 322 is located at a distance from the electromagnet 321 in FIG. 3, the polarity converter 322 can be located near the electromagnet 321 as shown in FIGS. 1 and 2.

Figure 4:
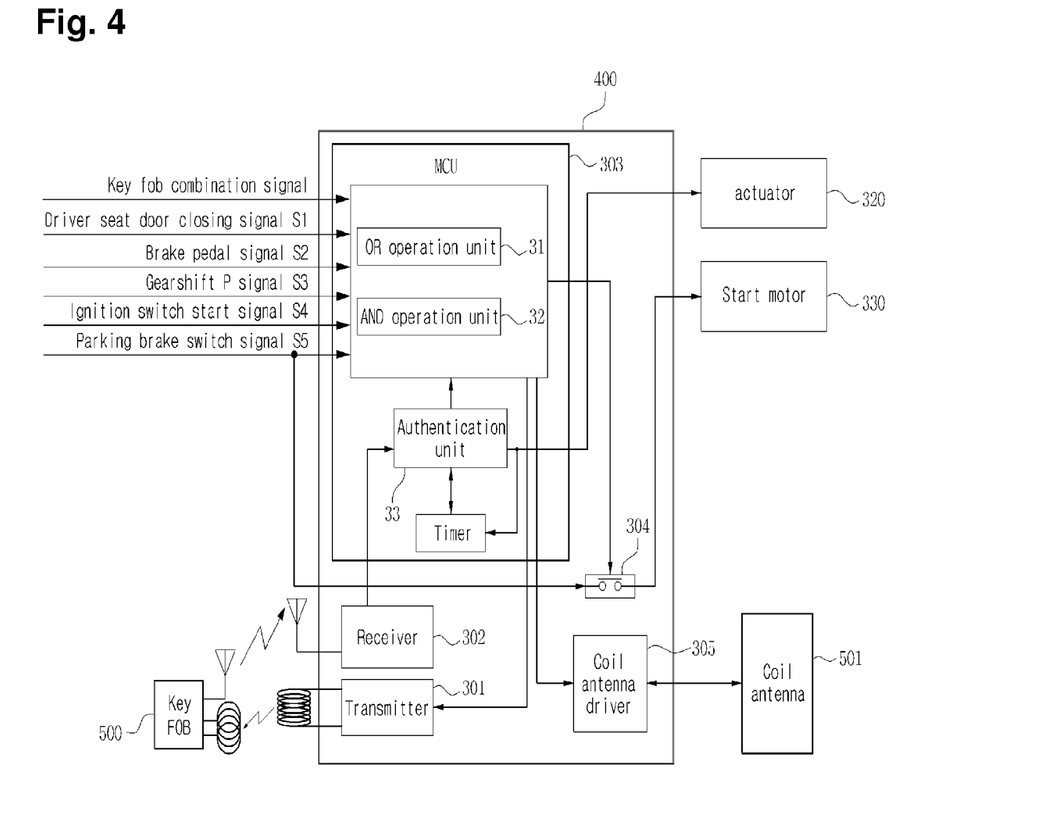
FIG. 4 is a view showing the internal configuration of a controller in the structure of the automobile electronic key for security according to the present invention.

FIG. 4 is a view showing the internal configuration of the controller in the structure of the automobile electronic key for security according to the present invention.

Referring to FIG. 4, the controller 400 in the structure of the automobile electronic key for security according to the present invention receives a plurality of signals from the outside, performs an operation for starting the engine of the automobile under a predetermined condition, authenticates the key fob 500 through communication with the key fob 500 and controls the car key 101 to be rotated when the key fob 500 passes authentication.

More specifically, the controller 400 includes a wireless transmitter 301, a wireless receiver 302, a micro control unit (MCU) 303, a start relay 304, and a coil antenna driver 305.

The wireless transmitter and the wireless receiver 301 and 302 transmit and receive data through wireless communication with the key fob 500. That is, the wireless transmitter 301 transmits a radio signal to the key fob 500 to request the key fob 500 to send the ID thereof. The wireless receiver 302 receives the ID from the key fob 500. Preferably, the wireless transmitter 301 transmits an ID request signal to the key fob 500 through low frequency (LF) communication and the wireless receiver 303 receives the ID from the key fob 500 through radio frequency (RF) communication.

The MCU 303 includes an OR operation unit 31 that outputs a first control signal to the wireless transmitter 301 when a driver seat door closing signal S1 or a brake pedal signal S2 is on, an AND operation unit 32 that outputs a second control signal to the start relay 304 when the brake pedal signal S2, a gearshift parking (P) signal S3 and an ignition switch start signal S4 are simultaneously on, an authentication unit 33 for authenticating the key fob 500 using the ID received through the wireless receiver 302, and a timer 35 for counting the time elapsed after the key fob 500 is authenticated by the authentication unit 33.

The wireless transmitter 301 drives a transmission antenna driver (not shown) included therein to perform wireless communication for requesting the key fob 500 to send the ID thereof when receiving the first control signal from the OR operation unit 31. That is, the wireless transmitter 301 performs wireless communication with the key fob 500 to request the key fob 500 to transmit its ID only when one of the driver seat door closing signal S1 and the brake pedal signal S2 is input.

The authentication unit 33 compares the ID of the key fob 500 received through the wireless receiver 302 with a previously stored ID and authenticates the key fob 500.

The timer 35 counts the time elapsed after the key fob 500 is authenticated by the authentication unit 33. When an engine start completion signal is not input for a predetermined time after the key fob 500 is authentication, the actuator 320 is driven to move the locking member 310 such that the car key 101 becomes the unrotatable state. That is, the locking member 310 is moved again to switch the car key 101 to the unrotatable state to improve security when the engine is not started for a predetermined time even if the key fob passes authentication.

The MCU 303 turns on the start relay 304 when the brake pedal signal S2, the gearshift P signal S3 of an automatic transmission and the ignition switch start signal S4 are on after the key fob 500 is authenticated. Here, the brake pedal signal S2 is output as an on signal according to internal signal processing when a driver steps on a brake pedal and output as an off signal according to internal signal processing when the driver does not step on the brake pedal. The gearshift P signal S3 is output as an on signal when a gearshift of the automatic transmission is located in P position. In general, P (parking) of the gearshift is used when the automobile is parked or started, R (reverse) is used when the automobile moves back, N (neutral) is used when the automobile is started to the neutral position or stopped for a long time, and D (drive) is used when the automobile runs. When the engine of an automatic car is started, the gearshift is placed to P and moved to R-N-D. Here, the MCU 303 checks P state corresponding to top priority state. When the gearshift is located at P position, the gearshift P signal S3 is output as an on signal.

The start relay 304 can be configured of a switch. The switch opened in the initial stage is closed when the second control signal is received from the MCU 233 to supply current provided through an ignition switch to a start motor 330 for starting the engine.

Furthermore, the MCU 303 drives the actuator 320 when the key fob 500 passes authentication. Here, the actuator 320 controls the movement of the locking member 310 such that the car key 101 is switched to the rotatable state. If the key fob does not pass authentication, the actuator 320 is not driven. Accordingly, users other than the proper user cannot be authenticated, and thus the car key 101 is switched to the unrotatable state. This improves the security of the automobile.

When a contact signal of the key fob 500 is input to the controller 400, the switch 304 is on in order to drive the coil antenna driver 305. Accordingly, the coil antenna driver 305 induces a voltage to a coil antenna 501 included in the electronic key structure to supply power to the battery included in the key fob 500.

After the key fob 500 is authenticated, the MCU 303 turns on the start relay 304 when the brake pedal signal S2, the gearshift P signal S3 of the automatic transmission and the ignition switch start signal S4 are simultaneously on. Furthermore, the MCU 303 can turn on the start relay 304 even when the gearshift P signal S3, a parking brake switch signal S5 and the ignition switch start signal S4 are simultaneously on.

Figure 5:
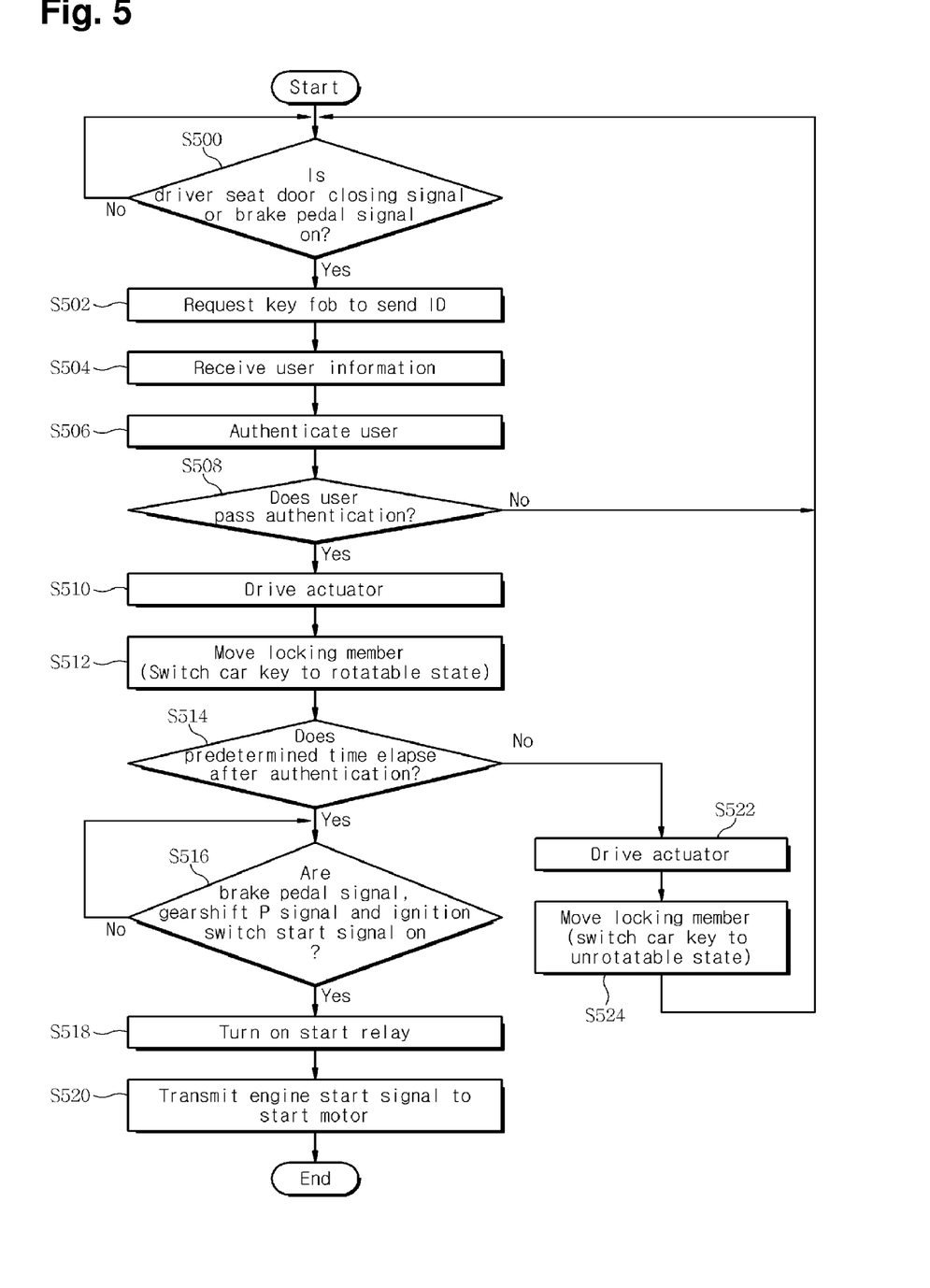
FIG. 5 is a flow chart of a method for performing the function of the structure of the automobile electronic key for security according to the present invention.

A method for performing the function of the automobile electronic key structure for security according to an embodiment of the present invention will now be explained with reference to FIGS. 1 through 5. FIG. 5 is a flow chart of the method for performing the function of the structure of the automobile electronic key for security according to the present invention.

The controller 400 determines whether at least one of the driver seat door closing signal S1 and the brake pedal signal S2 is on in operation S500. It is determined that at least one of the driver seat door closing signal S1 and the brake pedal signal S2 is on in operation S500, the controller 400 requests the key fob 500 to send the ID thereof through wireless communication with the key fob 500 in operation S502. Then, the controller 400 receives the ID from the key fob 500 in operation S504. Subsequently, the controller 400 compares the received ID with an ID previously stored therein to authenticate the key fob 500 in operation S506.

When the key fob 500 passes authentication in operation S508, the controller 400 drives the actuator 320 in operation S510. The locking member 310 is moved according to the operation of the actuator 320 to switch the car key 101 to the rotatable state in operation S512. That is, according to the method for performing the function of the automobile electronic key structure according to the present invention, the car key 101 can be rotated only when the key fob passes authentication.

When the key fob passes authentication in operation S514, the timer 35 operates to determine whether a predetermined time has elapsed after the key fob 500 is authenticated.

When the predetermined time has not elapsed, the controller 400 determines whether all the brake pedal signal S2, the gearshift P signal S3 and the ignition switch start signal S4 are on before the predetermined time elapses in operation S516.

When it is determined that all the three signals S2, S3 and S4 are on in operation S516, the controller 400 turns on the start relay 304 in operation S518. Then, the controller 400 transmits the ignition switch start signal S4 for starting the engine from the ignition switch to the start motor 330 in operation S520. The start motor 330 starts the engine of the automobile according to the ignition switch start signal S4. Here, the ignition switch start signal S4 is used for the last step of four steps including a locking step, an accessory power supply step, a controller and driver on step and a starting step according to the rotation of the car key 101.

When it is determined that the engine start completion signal is not received within the predetermined time in operation S514, that is, when the predetermined time elapses before the engine start completion signal is received, the controller 400 drives the actuator 320 in operation S522 to move the locking member 310 such that the car key 101 is switched to the unrotatable state in operation S524.

As described above, in the method for performing the function of the automobile electronic key structure according to the present invention, the car key can be rotated after the key fob is authenticated such that only a proper user who carries the key fob 500 can start the engine of the automobile.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A structure of an automobile electronic key for security, comprising:
    an ignition knob body provided at the front of a key cylinder into which a car key is inserted;
    an ignition knob rotator provided at the front of the ignition knob body and including an actuator operating according to a driving signal;
    a rotation axis located inside the ignition knob body in parallel with the axial direction of the key cylinder;
    a connecting part located in the ignition knob body and at the back of the rotation axis and adapted to connect the key cylinder and the ignition knob body, the ignition knob body including a locking hole located at the front of the connecting part inside the ignition knob body;
    a locking member located inside the ignition knob rotator on one side of the central axis of the key cylinder and adapted to be moved by the actuator in parallel with the axial direction of the key cylinder from or into the locking hole such that the car key is switched to a rotatable state or unrotatable state according to the position of the locking member with the locking hole; and
    a controller for generating the driving signal and performing authentication on a key fob and driving the actuator according to whether the key fob passes authentication to move the locking member such that the car key is switched to the rotatable state or the unrotatable state,
    wherein the controller is configured to perform authentication on the key fob by determining whether at least one of a driver seat door closing signal and a brake pedal signal is on, requesting the key fob of an automobile to send an ID thereof and receiving the ID from the key fob, and authenticating the key fob using the received ID, and
    wherein the ignition knob body is separated from the key cylinder and combined with the key cylinder according to the car key inserted into the key cylinder.

2. The structure of claim 1, wherein the controller drives the actuator to move the locking member such that the car key is switched to the rotatable state when the key fob passes authentication and drives the actuator to move the locking member such that the car key is switched to the unrotatable state when the key fob does not pass authentication.

3. The structure of claim 2, wherein the car key is switched to the rotatable state when the locking member is ejected from the locking hole and switched to the unrotatable state when the locking member is inserted into the locking hole.

4. The structure of claim 3, wherein the locking member is moved in a first direction parallel with the axial direction of the key cylinder to be ejected from the locking hole such that the car key is switched from the unrotatable state to the rotatable state, and the ignition knob rotator is moved in a second direction opposite to the first direction and rotated to start a car.

5. The structure of claim 1, wherein the locking member is an electromagnet having a predetermined length.

6. The structure of claim 1, wherein the controller compares the ID received from the key fob with a previously stored effective ID to authenticate the key fob.

7. The structure of claim 1, wherein the actuator comprises:
    an electromagnet wound by a coil in a predetermined solenoid form; and
    a polarity converter for converting polarities of both ends of the electromagnet,
    wherein the locking member is inserted into or ejected from the locking hole according to polarity change in the electromagnet.

* * * * *